Figure 1:
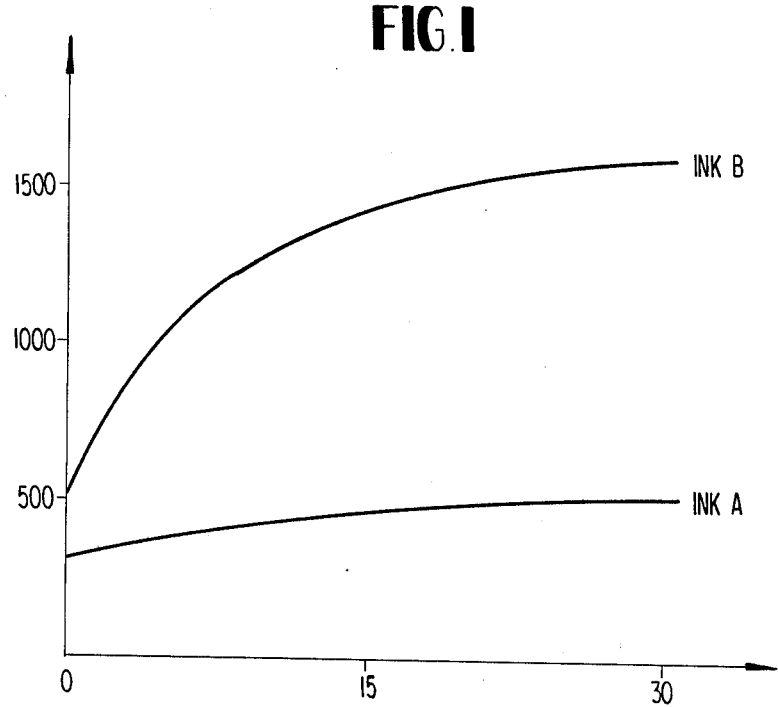

United States Patent [19]

Cabut et al.

[11] 3,985,569

[45] Oct. 12, 1976

[54] STABLE PIGMENTS

[75] Inventors: Louis Antoine Cabut, Nogent sur Oise; Michel Ernest Antoine Huille, Creil, both of France

[73] Assignee: Produits Chimiques Ugine Kuhlmann, Paris, France

[22] Filed: July 15, 1975

[21] Appl. No.: 596,133

[30] Foreign Application Priority Data

July 19, 1974    France .............................. 74.25133

[52] U.S. Cl. ............................ 106/288 Q; 106/309; 260/314.5
[51] Int. Cl.² ......................................... C04B 31/00
[58] Field of Search ....................... 106/288 Q, 309; 260/314.5

[56] References Cited
UNITED STATES PATENTS

| | | | |
|---|---|---|---|
| 3,296,008 | 1/1967 | Pugin .............................. | 106/288 Q |
| 3,536,502 | 10/1970 | Von et al. ....................... | 106/288 Q |
| 3,764,361 | 10/1973 | Kienzle et al. .................. | 106/288 Q |
| 3,767,442 | 10/1973 | Kienzle et al. .................. | 106/288 Q |

*Primary Examiner*—Patrick P. Garvin
*Assistant Examiner*—John P. Sheehan
*Attorney, Agent, or Firm*—Beveridge, DeGrandi, Kline & Lunsford

[57] ABSTRACT

The preparation of pigment compositions with a base of copper phthalocyanine is disclosed, which pigments are stable to crystallization.

There is incorporated in the copper phthalocyanine pigments to be stabilized a compound of the formula:

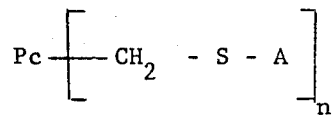

wherein Pc represents phthalocyanine, A represents alkyl, cycloalkyl, unsubstituted aralkyl or aralkyl substituted by low molecular weight alkyl groups, and $n$ is a number from 1 to 8.

The stabilized pigment compositions according to the invention are particularly well suited for coloring printing inks.

6 Claims, 2 Drawing Figures

STABLE PIGMENTS

The present invention relates to the preparation of pigment compositions with a base of copper phthalocyanine, which are rendered crystallization stable. The resulting stabilized pigment compositions are particularly well suited for coloring of solvent base printing inks. The rheological properities, in particular viscosity, of the inks pigmented with the pigment compositions prepared according to this invention remain stable with time.

It is known that copper phthalocyanine pigments can be obtained in several crystalline forms. These forms are designated in this field of technology by the terms alpha, gamma, delta, epsilon and are metastable and present the drawback of being crystallizable. In the presence of solvents and more particularly aromatic organic solvents, they have a tendency to come back to the stable beta form, which is accompanied by a change of shade, an increase of the thickness of the particles and a very considerable reduction of the coloring power.

This phenomenon is a definite problem when these pigments are used in paints, in plastics and especially in solvent base printing inks where the phenomenon is accompanied by a considerable modification of the rheological properties of the resulting inks.

One suggestion to avoid such a polymorphic transformation resides in using the pigment in the stable beta form. However, this proposal does not completely solve the problem of the stability of the pigment, because, although transformation of the crystalline form does not occur during exposure of the pigment in the beta phase to heat or crystallization solvents, the pigment particles have a tendency to undergo a growth of crystals. As a result of the growth of crystals, the pigment suffers a loss of coloring power and an undesirable modification of the pigment properties occurs leading to an unwanted increase of the viscosity of the media into which they are incorporated.

To avoid this evolution, it has been proposed to stabilize the copper phthalocyanine in the alpha phase by introduction of chlorine in the molecule, preferably in position 4 (See U.S. Pat. Nos. 2,933,505 and 3,024,247). However, this process presents the drawback of causing a considerable greening of the shade of the pigments; and, in addition, its effectiveness is not always satisfactory particularly when undesirable rheological modifications of the printing inks are to be avoided.

More recently, it has been conceived of stabilizing pigments by incorporating compounds derived from chloromethyl phthalocyanine (See French Pat. Nos. 2,114,243; 2,114,244 and 2,114,245, and their first additions 73,18,490; 73,18,491 and 73,18,492 respectively). This incorporation brings about an appreciable improvement of the stability of the pigment compositions in regard to aromatic organic solvents; however, the viscosity of the application media, in particular printing inks, continues to undergo considerable modifications with time.

An advantageous way has now been found by applicant to stabilize pigments and this is accomplished by incorporating into the copper phthalocyanine pigments a compound of the general formula:

wherein Pc represents the phthalocyanine moiety, group or radical, A represents alkyl, cycloalkyl or aralkyl which may or may not be substituted by low molecular weight alkyl groups (1 to 4 carbon atoms), and $n$ is a number from 1 to 8, preferably 2 or 3. When A is alkyl the number of carbon atoms may range from 1 to 18, preferably 4 to 12.

The phthalocyanine group represented by Pc in the above formula can be metallized or not. As metallized phthalocyanine there can be cited copper phthalocyanine in alpha or beta form.

The copper phthalocyanine pigments to be stabilized can be in one of the crystalline forms alpha, beta, gamma, delta, epsilon (form also designed by the letters R or X).

As examples of the compounds of formula (I) there can be cited tris-(butylthio-methyl)-cuprophthalocyanine, tris-(tertiobutyl-thio-methyl) cuprophthalocyanine, bis-(dodecylthiomethyl) cuprophthalocyanine, bis-(tertio-octylthio-methyl) cuprophthalocyanine, bis-(tertiononylthio-methyl) cuprophthalocyanine, tris-(cyclohexylthio-methyl) cuprophthalocyanine, tris-(benzylthiomethyl) cuprophthalocyanine.

The compounds of formula (I) can be obtained by causing a halogenomethyl phthalocyanine to react with an A—SH thiol, as is known in the art and as described, for example, in British Pat. No. 587,636.

Incorporation of the phthalocyanines of formula (I) into the copper phthalocyanine pigments to be stabilized can be done by simple mixing, in aqueous or organic diluent suspension, at ambient temperature or hot, followed by filtering and draining.

It is also possible to dry grind the copper phthalocyanine to be stabilized and the phthalocyanine of formula (I) in the presence of a water-soluble salt then take up the mixture with hot water to eliminate the salt, filter and dry.

It is also possible to malax the pigment to be stabilized as a press paste with the stabilizing phthalocyanine by forming a paste mixture.

There are incorporated 1 to 20%, preferably 2 to 10% of the compound of formula (I).

The pigment compositions prepared according to this invention with a base of a copper phthalocyanine pigment in one of the crystalline forms cited above with the compounds of formula (I) do not crystallize or change form upon contact with aromatic solvents, even hot aromatic solvents. Further, the viscosity of the solvent base pigment compositions, in particular that of printing inks, does not undergo considerable variations during extended storage. They also have the advantage of having a good resistance to bleeding, which could not be anticipated because of the solubility of the compounds of formula (I) in aromatic solvents such as xylene or toluene. They are in addition fast to overspray this property is verified by the absence of migration of pigments in a white paint covering an area colored with a phthalocyanine base paint.

The following examples, in which the parts and percentages are expressed in weight, illustrate the invention without limiting it.

EXAMPLE 1

40 parts of copper phthalocyanine (C.I. 74 160) in beta form are put in suspension in 80 parts of sulfuric chlorohydrin and 70 parts of 100% sulfuric acid. There are added 50 parts of paraformaldehyde and heated for 3 hours at 70°–75° C, then for 2 hours at 90° C. It is allowed to cool to ambient temperature and is poured on a mixture of water and ice. The precipitate formed is filtered, washed to neutrality and dried at 40°–50° C. A product is obtained the chlorine content of which is 10.5% and corresponds to dichloromethyl copper phthalocyanine.

To 60 parts of lauryl mercaptan are added 5 parts of sodium and the admixture is heated until complete dissolution. There are then added, with stirring, 10 parts of bis-(chloromethyl) cuprophthalocyanine and this is then heated at 130°–135° C for about 24 hours. It is allowed to cool to 80° C and the reaction product is precipitated by addition of methanol. It is filtered, washed and dried. There are obtained 14 parts of a greenish blue powder whose composition corresponds to that of bis-(n-dodecylthio methyl) copper phthalocyanine.

| Analysis | N% | S% | Cu% |
| --- | --- | --- | --- |
| Calculated for $C_{58}H_{10}N_8S_2Cu$ | 11.14 | 6.37 | 6.33 |
| Found | 11.28 | 6.27 | 6.56 |

In a container placed in a shaking apparatus there are mixed thoroughly for about 10 hours, 95 parts of chlorine-free copper phthalocyanine pigment in alpha form with 5 parts of bis-(n-dodecylthio methyl) copper phthalocyanine. The mixture obtained is very stable in solvents.

The recrystallization stability is checked in the following way:

1 g of pigment mixture formed according to the invention is put in suspension in 100 ml of xylene; it is heated 2 hours, with reflux, cooled, filtered, and washed with acetone. This mixture, treated with xylene, is incorporated in a paint. In relation to untreated pigment, it does not present any variation of shade or yield.

If the same test is applied to an alpha form copper phthalocyanine pigment, in pure state, free of the bis-(n-dodecylthio methyl) copper phthalocyanine, it recrystallizes completely in boiling xylene, in the form of large needles of beta variety. When incorporated in a paint and applied, in comparison with the pigment not treated with xylene, it presents a clearly inferior yield.

EXAMPLE 2

There are thoroughly mixed 95 parts of a copper phthalocyanine pigment of the beta variety with 5 parts of bis-(dodecylthio methyl) cuprophthalocyanine. The pigment composition obtained is stable to crystalline growth when it is put in contact with crystallizing solvents such as toluene or xylene. Further, the viscosity of the solvent base printing inks, prepared from this pigment composition practically does not vary during extended storage. Verification is performed in the following way:

By means of a binder for photogravure containing 47% calcium resinate, 45% toluene and 8% formophenolic (phenolformaldehyde) resin, there are successively prepared by grinding for 45 minutes in a ball mill, three inks containing respectively: Ink A: 10% of the above pigment composition prepared according to the invention, Ink B: 10% of pigment stabilized with 5% of tris-(2,3,5-trimethyl phenoxy methyl) copper phthalocyanine (example 2 of French patent 2,114,243), Ink C: 10% of copper phthalocyanine pigment (beta form) free of stabilizer.

Figure 2:
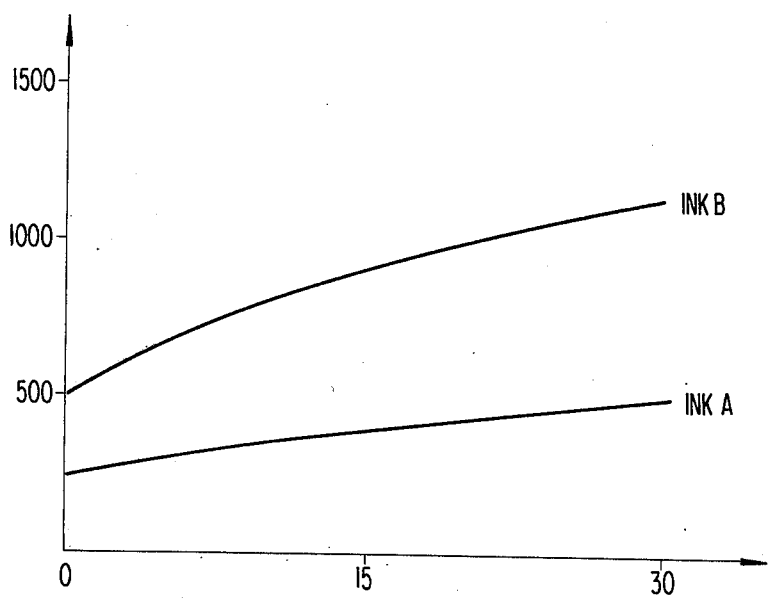

These inks are stored at 25° C and the variation of their viscosity there was measured as a function of time. In the drawing, FIGS. 1 and 2 show the variations of viscosity of inks A and B during this ageing test; the viscosity of ink C rapidly becomes much higher and could not be measured under these conditions. The length of storage in days is represented on the abscissa, and the viscosity expressed in centipoises on the ordinate. The measurements were made respectively at 50 rpm (FIG. 1) and 100 rpm (FIG. 2) with the mobile part No. 3 of a Brookfield viscosimeter.

Examination of the curves shows that ink A presents a stability in storage clearly superior to that of ink B. This property is very advantageous because a constancy of rheological properties, in particular viscosity of printing inks, is required more and more by modern printing techniques.

EXAMPLE 3

There is prepared by malaxing 100 parts of press paste of copper phthalocyanine is alpha form containing 25 parts of dry pigment with 1 part of tris-(n-heptylthio methyl) cuprophthalocyanine; the mixture is dried and then reduced to a fine powder.

The pigment composition obtained is stable to solvents. When subjected to the boiling xylene test as described in example 1, it does not recrystallize and does not change crystalline form.

EXAMPLE 4

In the preceding example, the tris-(n-hepthylthio methyl) cuprophthalocyanine is replaced by tris-(tertio-octylthio methyl) nickel phthalocyanine, and there is obtained a pigment composition stable to xylene which, when it is incorporated in a photogravure printing ink, gives it a good stability with time.

EXAMPLE 5

There are ground in a ball mill 240 parts of chlorine-free raw copper phthalocyanine with 10 parts of non-metal bearing tris-(butylthio methyl) phthalocyanine, 1000 parts of calcium chloride and 25 parts of tetra-chloroethylene. After 48 hours of grinding, the mass is taken up with hot water, filtered, washed until complete elimination of the salt, and then dried. A beta form pigment is obtained, solid to recrystallization, which makes possible the preparation of printing inks whose viscosity is stable over a period of time.

EXAMPLE 6

There are thoroughly mixed for 24 hours in a container placed in a shaking apparatus 5 parts of bis-(cycloexylthio methyl) cuprophthalocyanine and 95 parts of phthalocyanine pigment made up in great part of the epsilon form whose diffraction spectrum under X ray is characterized by the following principal reticular distances: 4.20–5.07–6.25–9.7 and 11.8 Å. The mixture obtained is very stable to solvents; this can be verified by applying the xylene test described in example 1. Examination of the X-ray diffractogram of this mixture, after xylene treatment, confirms that the crystalline system has not evolved; the same reticular distances as those given above are found.

The same xylene treatment made on the unstabilized pigment involves the total transformation of this latter into beta form characterized by the reticular distances:

2.94–3.20–3.41–3.76–4.91–5.77–6.33–7.13–8.43–9.7 and 12.6 Å.

Further variations will become apparent to those skilled in the art from a consideration of the foregoing.

We claim:

1. A pigment composition consisting of an admixture of a copper phthalocyanine pigment with 1 to 20% of a stabilizing compound of the formula:

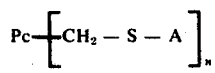

wherein Pc represents the unmetallized or metallized phthalocyanine moiety, A represents alkyl, cycloalkyl, aralkyl unsubstituted or aralkyl substituted by alkyl from 1 to 4 carbon atoms, and $n$ is a number from 1 to 8.

2. A pigment composition according to claim 1 wherein the phthalocyanine pigment is copper phthalocyanine in beta form.

3. A pigment composition according to claim 1 wherein the phthalocyanine pigment is copper phthalocyanine in one of the forms alpha, gamma, delta, or epsilon.

4. A pigment composition according to claim 1 wherein $n$ is equal to 2 or 3.

5. A pigment composition according to claim 1 containing 2 to 10% of the stabilizing compound (I).

6. A process for the stabilization of copper phthalocyanine pigments which comprises incorporating into a copper phthalocyanine pigment from 1 to 20% of a compound of the formula as defined in claim 1.

* * * * *